(12) United States Patent
Swain

(10) Patent No.: US 7,787,240 B2
(45) Date of Patent: Aug. 31, 2010

(54) DISPLAY SYSTEM IN ARTICLE OF CLOTHING

(76) Inventor: Dudley Swain, P.O. Box 8603, Los Angeles, CA (US) 90008

( * ) Notice: Subject to any disclaimer, the term of this patent is extended or adjusted under 35 U.S.C. 154(b) by 721 days.

(21) Appl. No.: 11/678,281

(22) Filed: Feb. 23, 2007

(65) Prior Publication Data

US 2008/0204440 A1 Aug. 28, 2008

(51) Int. Cl.
*H05K 7/14* (2006.01)

(52) U.S. Cl. .............. 361/679.03; 361/679.21; 248/917

(58) Field of Classification Search ........... 361/679.03, 361/679.21, 679.02, 679.01; 40/586; 340/539.13
See application file for complete search history.

(56) References Cited

U.S. PATENT DOCUMENTS

| | | | |
|---|---|---|---|
| 5,912,653 A | 6/1999 | Fitch | |
| 6,393,745 B1 | 5/2002 | Miki | |
| 6,522,531 B1 * | 2/2003 | Quintana et al. | 361/679.03 |
| 6,843,012 B1 | 1/2005 | Dodd | |
| 7,030,855 B2 | 4/2006 | Metcalf | |
| 7,265,970 B2 * | 9/2007 | Jordan | 361/679.27 |
| 2004/0187184 A1 | 9/2004 | Rubin et al. | |
| 2004/0189474 A1 | 9/2004 | Borovoy et al. | |
| 2005/0132290 A1 | 6/2005 | Buchner et al. | |
| 2005/0206616 A1 | 9/2005 | Harary | |
| 2006/0028430 A1 | 2/2006 | Harary et al. | |

* cited by examiner

*Primary Examiner*—Jayprakash N Gandhi
*Assistant Examiner*—Ingrid Wright
(74) *Attorney, Agent, or Firm*—Bruce A. Jagger

(57) ABSTRACT

An wearable assembly wherein a display system is incorporated into an article of clothing, such as a video jacket or vest. The display system includes at least an output device, a mass storage device, and an input device. The output device includes at least a display device with a substantially rigid display screen. The mass storage device is in content providing relationship to the output device. The input device includes operator accessible controls controllingly associated with the output and mass storage devices. An electrical power source is in electrical power supplying relationship to at least the display system. A carrying harness supports at least the display screen on a torso of a person wearing the article of clothing. The display screen is supported by the carrying harness so that the display screen is generally weight bearingly independent of the article of clothing. A pad is positioned between the carrier's torso and the display screen in motion stabilizing relationship with the display screen. A substantially transparent, impact, and scratch resistant pane is mounted to the article of clothing in substantial registry with the display screen so the display screen is visible through the pane to a viewer located outside of the article of clothing. A geographic position locator beacon member is associated with the article of clothing. Except for the display screen, the display system is substantially hidden from the viewer by the article of clothing.

4 Claims, 4 Drawing Sheets

DISPLAY SYSTEM IN ARTICLE OF CLOTHING

BACKGROUND OF THE INVENTION

1. Field of the Invention

The invention relates in general to methods and devices for wearable assemblies for the display of images, and, more particularly, embodiments of the present invention relate to video jackets wherein the weight of a display screen is directly supported by the torso of a wearer, and is stabilized by direct engagement with that torso.

2. Description of the Prior Art

A variety of wearable display systems had previously been proposed. Such systems include, for example, sandwich boards, video jackets, and wearable flexible video displays. One such prior system is described by Dodd U.S. Pat. No. 6,843,012, which discloses a framework in the nature of a back pack frame that is worn by a person and supports an LCD screen above the head of that person. The frame also supports a power supply, media player and controls for the system. Placing the screen above the head of the person is said to provide improved visibility for advertising messages. Metcalf U.S. Pat. No. 7,030,855 discloses flexible video display material in the form of a garment. Rubin et al. US 2004/0187184 also discloses a flexible video display material on a garment. Fitch U.S. Pat. No. 5,912,653 discloses a jacket with an LCD display zippered into an aperture in the jacket. The LCD display is supported by the jacket. The hardware includes a GPS beacon to provide information as to the location of the jacket. Borovoy et al. US 2004/0189474 discloses a "tag", such as a small LCD display, that is worn by a person. The tag is capable of displaying graphics and text images for communicating with similar tags worn by other people. The tags can also include GPS receivers for ascertaining the locations of the wearers of the tags. Harary et al. US 2006/0028430 discloses a video jacket wherein an LCD display is attached to and carried by a jacket for advertising or fashion purposes. Harary US 2005/0206616 has a similar disclosure.

Such prior art devices and methods are not without their shortcomings. A major shortcoming of typical prior art devices and methods is that they are not well suited or practical for continual day after day commercial usage for advertising display purposes. They tend to be difficult and/or unpleasant to view and/or to wear. Where, for example, a monitor is mounted on scaffolding above a person's head, many viewers will be interested more in how it works than in what is being displayed on the monitor. Also it invites some people to see if they can cause the person wearing it to fall down and break the device.

Portable advertising displays must be easy to read, without message diminishing distractions, safe, and comfortable to carry. A flexible display on a video jacket tends to be distorted, which makes it difficult to read, and distracts from the intended message, particularly with a constantly changing message. If anything about the system is visible except the display, the viewers tend to be distracted by watching the other parts of the system. A display that is being carried by a person should be as stable as possible. If the display is moving too much it is at best hard to read, and at worst it may make the reader who focuses closely on it feel woozy. Since a person may be wearing a video jacket or a similar article of clothing for several hours a day, it must be comfortable. The display should be mated to the jacket in such a way that it blends into the jacket and is not obscured by any part of the jacket. The display should not change the natural drape of the article of clothing to such a degree that it distracts from the message that is presented on the display screen of the assembly.

These and other difficulties of the prior art have been overcome according to the present invention.

BRIEF SUMMARY OF THE INVENTION

The present invention has been developed in response to the current state of the art, and in particular, in response to these and other problems and needs that have not been fully or completely solved by currently available expedients. Embodiments of the present invention effectively resolve at least the problems and shortcomings identified herein. Embodiments of the present invention are particularly suitable for use in advertising goods and services, particularly at venues where people are gathered for a specific purpose, such as a sporting event. These embodiments allow the displayed messages to be targeted to the specific interests of those gathered at a particular event.

An embodiment of the assembly according to the present invention comprises a wearable assembly wherein a display system is incorporated into an article of clothing, such as a video jacket or vest. The display system includes at least an output device, a mass storage device, and an input device. The output device includes at least a display device with a substantially rigid display screen. The mass storage device is in content providing relationship to the output device. The input device includes operator accessible controls controllingly associated with the output and mass storage devices. The wearable assembly is adapted to include an electrical power source in electrical power supplying relationship to at least the display system. Such display systems are well known and conventional. A carrying harness is adapted to supporting at least the display screen on a torso and below a neck of a person wearing the article of clothing. The display screen is supported by the carrying harness so that the display screen is generally weight bearingly independent of the article of clothing. A pad is adapted to being positioned between the carrier's torso and the display screen in motion stabilizing relationship with the display screen. A substantially transparent, impact, and scratch resistant pane is mounted to the article of clothing in substantial registry with the display screen. Thus, the display screen is visible through the pane to a viewer located outside of the article of clothing. A geographic position locator beacon member is associated with said article of clothing. Such geographic position locator beacon members are conventional and well known. Except for the display screen, the display system is substantially hidden from the viewer by the article of clothing.

A embodiment of the wearable assembly is configured such that the substantially transparent pane is attached to the display screen. In a further embodiment, the carrying harness is adapted to supporting at least the display screen on the back of the torso of the person carrying the assembly.

An embodiment of a method of displaying images from a wearable assembly according to the present invention utilizes a conventional display system that is incorporated into an article of clothing. The user selects a display system that includes at least one substantially rigid display screen. A conventional geographic position locator beacon member is also provided. The beacon member may be incorporated into the video jacket, or simply carrier by the wearer. The beacon member may be a simple transponder that reports its location when queried by a remote transmitter, or it may also provide location information to the wearer. The user mounts the display screen on a torso and below a neck of a person that has been selected to wear the article of clothing. The display screen is mounted in such a way that it is generally weight bearingly independent of the article of clothing. The weight of the display screen is not born to any significant degree by the article of clothing. A substantially transparent, impact, and scratch resistant pane is positioned in substantial registry with the display screen. The pane is mounted to the article of clothing in such a way that the display screen is visible through the pane to a viewer located outside of the article of clothing. Because of its attachment to the display screen, the weight of the pane is substantially born by the same support system as the display screen. The attachment to the jacket keeps the aperture in the jacket aligned with the display screen so that the jacket does not obscure the screen. The weight of the display screen and pane are such that they would distort the jacket if supported to any significant degree by the video jacket. This distortion would distract viewers from the appeal of the displayed images, and it would become uncomfortable for the wearer. A pad is positioned between the wearer's torso and at least a portion of the display screen in motion stabilizing relationship with the display screen. Except for the display screen, the article of clothing substantially conceals at least the display system from a viewer outside of the article of clothing. Electrical power is supplied to at least the display system, and images are allowed to appear on the display screen in such a way that they are visible to the viewer. In embodiments where two display screens are employed, typically, one is positioned for viewing from persons in front of the wearer. The second display screen is positioned for viewing by people behind the wearer. Both display screens are supported in such a way that they are substantially weight bearingly independent of the video jacket.

To acquaint persons skilled in the pertinent arts most closely related to the present invention, an embodiment of a video display jacket that illustrates a best mode now contemplated for putting the invention into practice is described herein by, and with reference to, the annexed drawings that form a part of the specification. The exemplary video jacket assembly is described in detail without attempting to show all of the various forms and modifications in which the invention might be embodied. As such, the embodiments shown and described herein are illustrative, and as will become apparent to those skilled in the art, can be modified in numerous ways within the scope and spirit of the invention, the invention being measured by the appended claims and not by the details of the specification or drawings.

Other objects, advantages, and novel features of the present invention will become more fully apparent from the following detailed description of the invention when considered in conjunction with the accompanying drawings, or may be learned by the practice of the invention as set forth herein.

BRIEF DESCRIPTION OF THE DRAWINGS

The present invention provides its benefits across a broad spectrum of video jacket displays and methods. While the description which follows hereinafter is meant to be representative of a number of such applications, it is not exhaustive. As those skilled in the art will recognize, the basic apparatus and method taught herein can be readily adapted to many uses. This specification and the claims appended hereto should be accorded a breadth in keeping with the scope and spirit of the invention being disclosed despite what might appear to be limiting language imposed by the requirements of referring to the specific examples disclosed.

Referring particularly to the drawings for the purposes of illustrating the invention and its presently understood best mode only and not limitation.

DETAILED DESCRIPTION OF THE PREFERRED EMBODIMENTS

Figure 1:
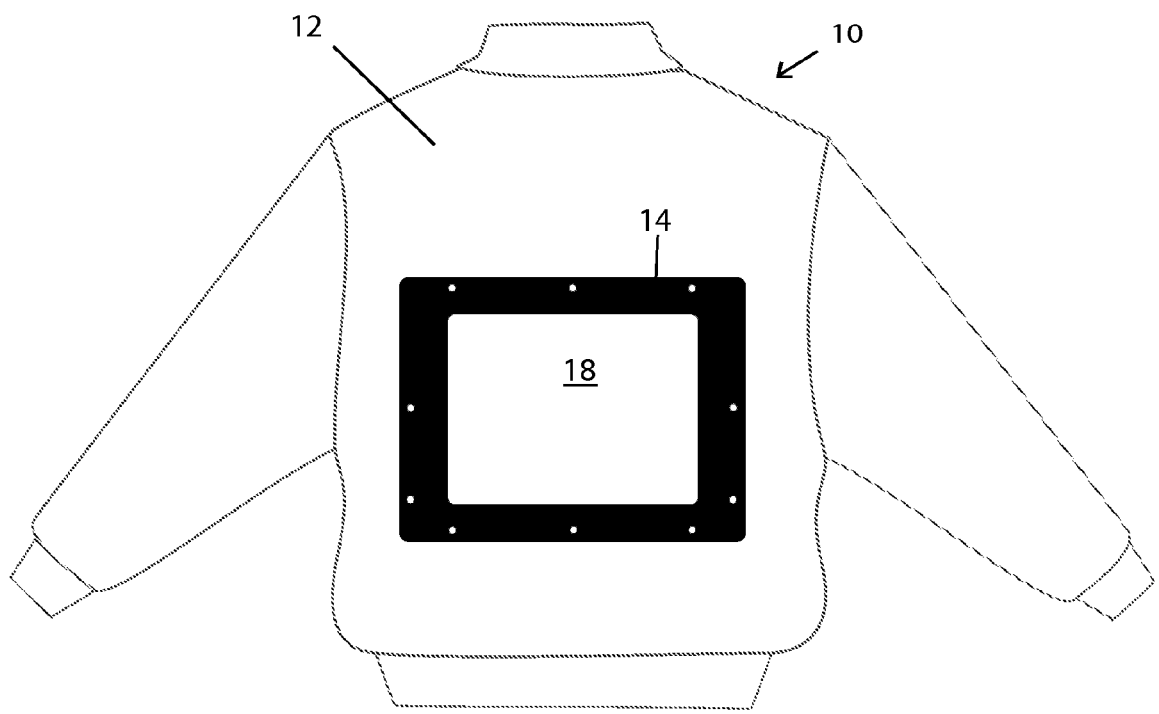
FIG. 1 is a diagrammatic view of an embodiment of the invention illustrating the back of a video jacket with a display screen visible through an aperture in the back of the video jacket.
Figure 2:
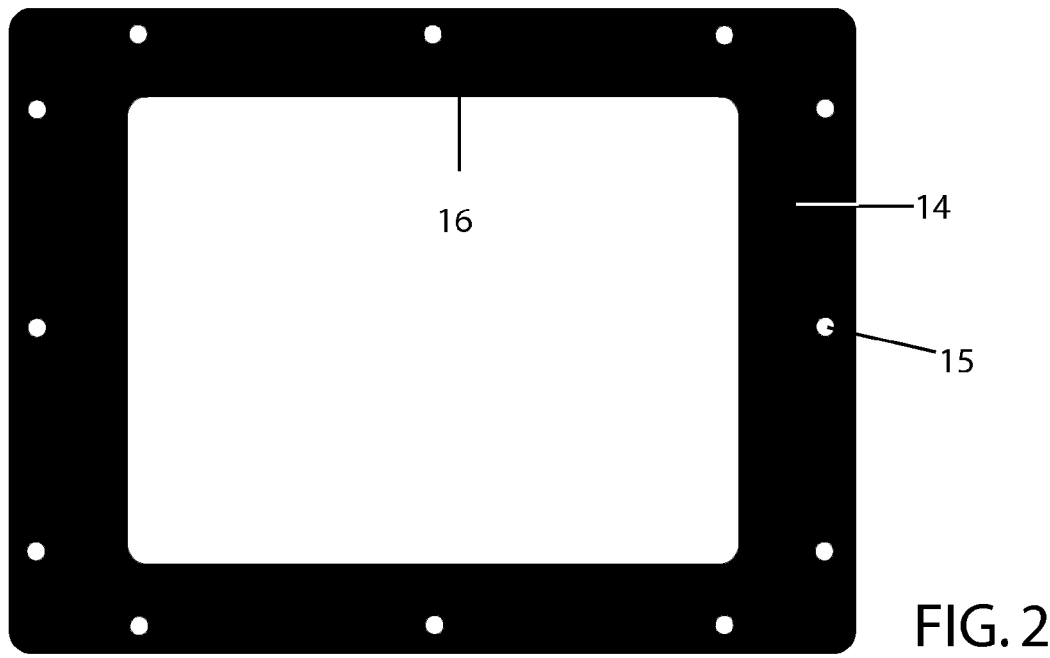
FIG. 2 depicts one embodiment of an apertured frame for mounting a transparent pane and display screen in an aperture in a an article of clothing in accordance with the teachings of the present invention
Figure 3:
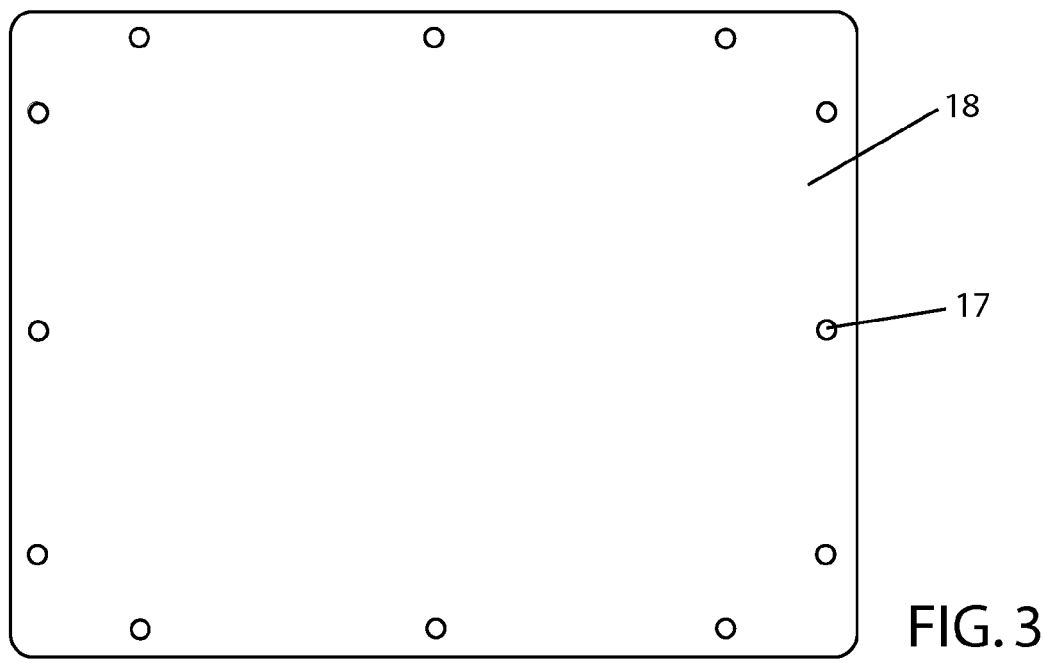
FIG. 3 depicts one embodiment of a substantially transparent, impact, and scratch resistant pane for mounting to an article of clothing in substantial registry with a display screen according to the teachings of the present invention.

Referring now to the drawings wherein like reference numerals designate identical or corresponding parts throughout the several views. It is to be understood that the drawings are diagrammatic and schematic representations of various embodiments of the invention, and are not to be construed as limiting the invention in any way. The use of words and phrases herein with reference to specific embodiments is not intended to limit the meanings of such words and phrases to those specific embodiments. Words and phrases herein are intended to have their ordinary meanings, unless a specific definition is set forth at length herein.

Referring particularly to the drawings, there is illustrated generally at 10 a wearable assembly. Wearable assembly 10 includes an article of clothing comprised generally of a back portion 12, a front portion 38, and sleeves. The back portion 12 has an aperture located within it. The aperture is located so that it opens over the back of the torso of a wearer of the article of clothing. The aperture is framed by a pane mounting frame 14. The inner perimeter 16 of pane mounting frame 14 defines an aperture that is in substantial registry with the aperture in the back portion 12 of the article of clothing. The mounting frame 14 is adapted to hold a substantially transparent pane 18 over a display screen 20.

The frame-pane-display screen sub-assembly is held together, for example, by fasteners (not shown) projected through peripheral holes, of which 15 and 17 are typical, and substantially transparent pane 18, respectively. The fasteners, if they do not pass through the article of clothing, at least serve to clamp the frame 14 and substantially transparent pane 18 to the article of clothing. The fasteners also hold the frame-pane-display screen sub-assembly together so that its weight is substantially all supported on, for example, the back of a wearer's torso 22 by a carrying harness comprised, for example, of straps 24, 26, and 28.

The support of the carrying harness prevents the weight of the frame-pane-display screen sub-assembly from distorting the article of clothing to which it is clamped. Although the display screen 20 and the article of clothing are held in fixed relationship to one another, they are not held in such a way that the garment bears any significant amount of the weight of the frame-pane-display screen sub-assembly. That is, this sub-assembly is weight bearingly independent of the article of clothing. The support provided by the carrying harness keeps this sub-assembly from shifting around on the wearer's torso. This support also makes the weight comfortable for the wearer to carry. Different forms of carrying harness can be employed, if desired. The carrying harness can, for example, be in the form of a sleeve that wraps around the wearer's torso and fastens by the engagement of an area of hook and loop fasteners.

Display screen 20 should be positioned in the plane that the article of clothing normally assumes as it drapes over the torso of the wearer. In general, when the display screen is mounted on the back of the wearer's torso, this requires that the lower edge of display screen 20 be held out from the small of the wearer's back. Also, the lower edge of the display screen generally needs to be supported so that it does not flap loosely. To this end, a pad of the proper thickness is positioned between the lower edge of the display screen and the wearer's back. The thickness of this pad should be tailored to the particular contours of an individual wearer's torso. For example, where there is only a small distance between the wearer's back and the lower edge of the display screen a relatively thin pad 30 would be appropriate. Where the positioning of the display screen is such that there is a larger gap between the lower edge of the display screen and the wearer's torso, a relatively thick pad, of which 32 is typical would be selected. In general, a number of different pads of differing thicknesses are provided to allow the tailoring of the position of the lower edge of the display screen to the configuration of a particular wearer's torso. A pad of the desired thickness can be constructed out of a plurality of relatively thin pad elements stacked together, if desired. The pad stabilizes the display screen. The display screen, for purposes of durability and to provide a convenient structure to which to mount the carrying harness and the pad, of which 30 and 32 are typical, is generally mounted to a back plate 34. The pad can be mounted to the back plate 34 by way of some releasable fastening expedient, such as, for example, hook and loop fasteners, releasable adhesive, mechanical fasteners, or the like. The pad simply rests against the back of the wearer's torso.

Figure 4:
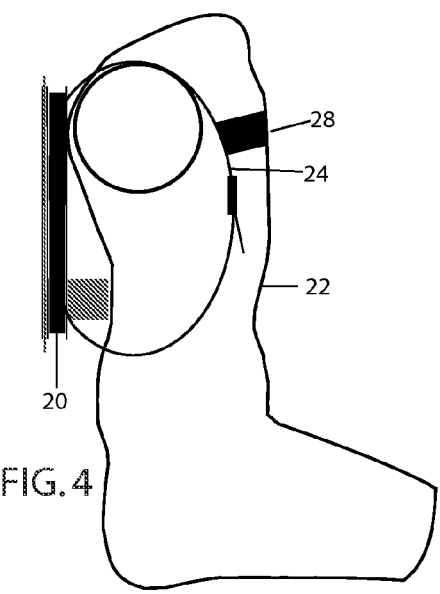
FIG. 4 diagrammatically depicts a side view of a partial human form with a rigid display screen mounted to a back of a torso by way of a carrying harness, where the display screen is stabilized by a pad between the display screen and the small of a human back.
Figure 5:
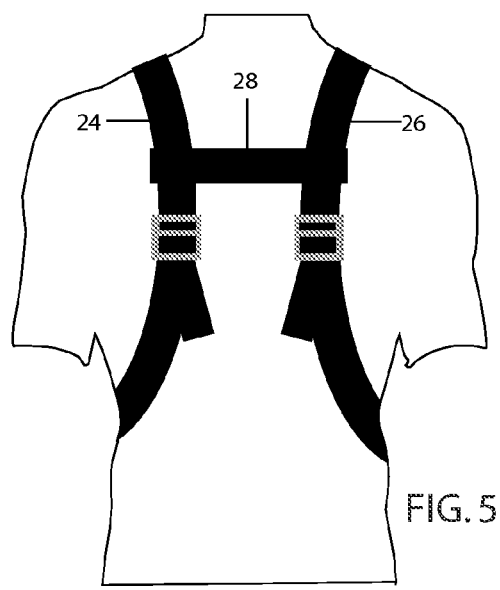
FIG. 5 is a diagrammatic front view of the embodiment shown in FIG. 4.
Figure 7:
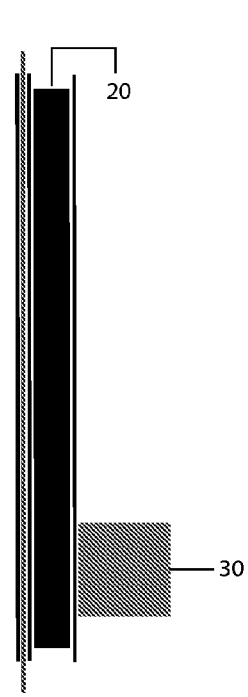
FIG. 7 is a side view similar to FIG. 6 illustrating by comparison to Fig. the use of a differently sized stabilizing pad.
Figure 6:
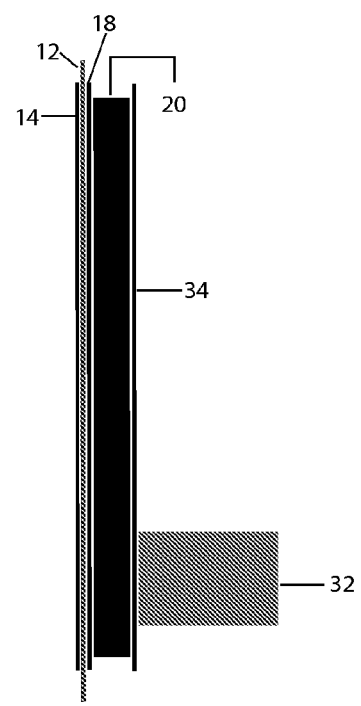
FIG. 6 is a side view that diagrammatically illustrates the use of a pad mounted in motion stabilizing relationship to a frame-pane-display screen assembly.
Figure 8:
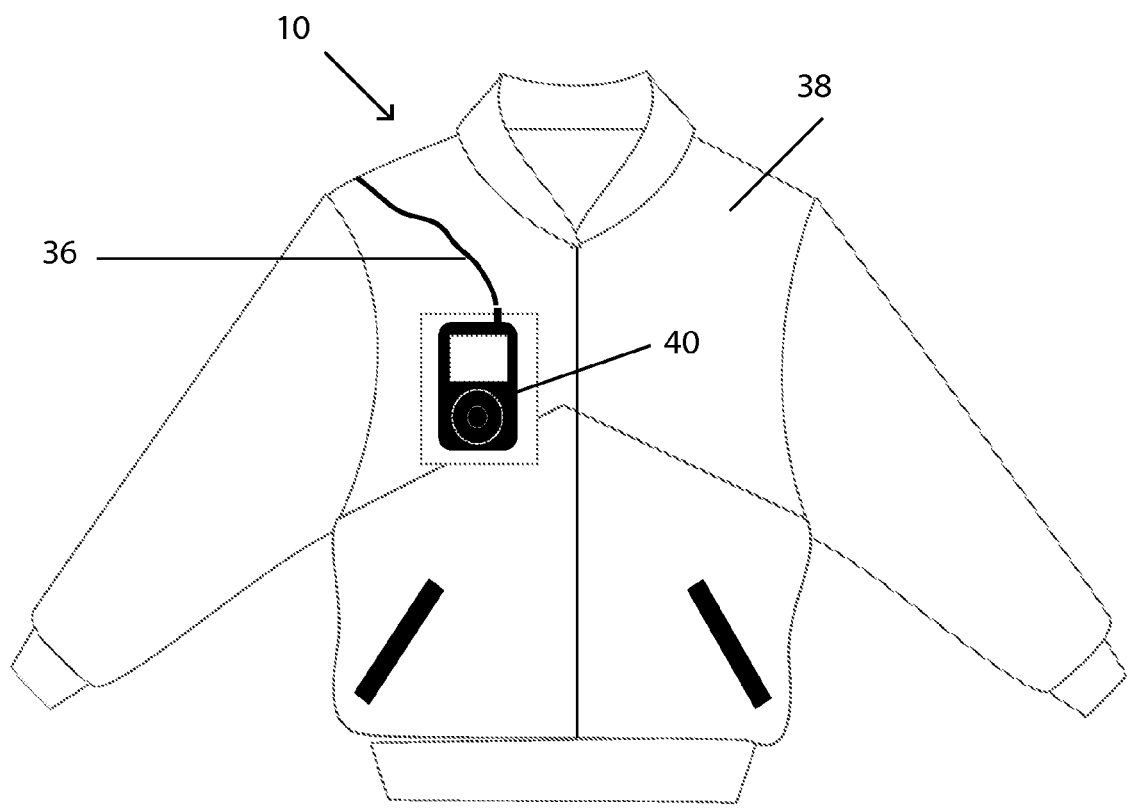
FIG. 8 is a diagrammatic front view of a wearable assembly wherein an article of clothing is illustrated in a see through view showing the concealed placement of actuating and operating devices for display screen located out of sight on the back of the wearer's torso.

The positioning of the display screen relative to a wearer's torso is illustrated, for example, in FIG. 4. The display screen is illustrated in such a position relative to torso 22 that it is higher on the back than would normally be desirable, because in the illustrated position it would likely cause an unusual bulge in the upper back portion of the article of clothing. Typically, unless some special purpose dictated otherwise, the display screen would preferably be lower on the back of the torso.

The display screen is generally connected by way of an electrical or optical connector 36 to an electronic device, of which 40 is typical. The connector and electronic device are concealed from the view of passersby by the article of clothing. The electronic device is conventional and it can include some storage medium for the content that is to be displayed on the display screen as well as the software and hardware that is required to actuate the desired display on the display screen.

A source of electrical energy is required and it may be incorporated into electronic device 40 or it may be in a separate package. The controls for operating the assembly are conveniently associated with electronic device 40 where they are accessible to the wearer. Alternatively, electronic device 40 can incorporate a receiver that is capable of receiving signals that control the operation of the assembly and/or provide the content that is to be displayed on the display screen. Connector 36 is not essential, because a signal may be transmitted wirelessly to the display screen from electronic device 40, or from some remote location not carried by the wearer.

Embodiments are intended to be worn for long periods of time. A comfortable wearing experience is accomplished by providing an article of clothing that is suitable for the weather, and placing at least the weight of the display screen on the torso of the person wearing the assembly. An aperture is cut in an otherwise conventional article of clothing. The display screen is assembled in registry with that aperture by way of assembling the apertured frame, the substantially transparent pane, and the display screen over the aperture in the article of clothing. The wearer puts on the article of clothing, positions the stabilizing pad, and adjusts the carrying harness so that the clothing is not bearing any significant part of the weight of the frame-pane-display screen assembly. Also, the wearer should adjust the carrying harness so that the article of clothing is not distorted by the weight of the frame-pane-display screen assembly. There should be nothing about the wearable assembly to distract the viewer from viewing the message on the display screen. There should be nothing about the assembly to distract or discomfit the wearer from presenting the message on the display screen to best advantage. This works equally well with summer and winter weight clothing. Embodiments of the present invention can be configured so that the display screen is observable by passersby positioned to the front of the wearer.

Embodiments of the article of clothing can include more than one garment, for example, a vest and a jacket, or the like. A battery, for example, may be concealed in a pants pocket while the rest of the assembly is in a video jacket. The nature of the article of clothing, whether it include one or more than one garment, should be such that the purpose of concealment of all but the display screen is accomplished.

For purposes of continuously monitoring the location of the wearer of the jacket a geographic position locator beacon member is provided in some embodiments. This allows a supervisor to maximize the value of the displayed messages by directing the wearer on a minute by minute basis to move from location to location. It also allows a supervisor to direct the wearer to display, or otherwise cause location appropriate messages to be displayed.

According to embodiments of the invention, the components of the display system, except for the display screen, are concealed from viewers. Except for the source of electrical energy (battery, fuel cell, or the like) the non-display screen components taken together typically weigh less than approximately two pounds. Typically, the display screen is the heaviest part of the assembly.

The display screen is conventional in design. A liquid crystal display (LCD) is typically adequate for purposes of the present invention, although plasma and other forms of display screens can be used, if desired. The display screen must be rugged enough to withstand usage day after day without failing. It must be bright enough to be easily read by viewers. Embodiments include color or black and white display screens, depending primarily on the nature of the messages that are intended to be displayed. The display screen must be light enough to be carried for extended periods of time without causing significant discomfort. The display screen should be protected from damage by the environment and passersby. Such protection is typically provided by some substantially transparent covering such as, for example, substantially transparent pane 18. The transparent covering should be impact and scratch resistant.

What have been described are preferred embodiments in which modifications and changes may be made without departing from the spirit and scope of the accompanying claims. Obviously, many modifications and variations of the present invention are possible in light of the above teachings. It is therefore to be understood that, within the scope of the appended claims, the invention may be practiced otherwise than as specifically described.

What is claimed is:

1. A wearable assembly wherein a display system is incorporated into an article of clothing, said wearable assembly comprising:

a display system including at least an output device, a mass storage device, and an input device, said output device including at least a display device having a substantially rigid display screen, said mass storage device being in content providing relationship to said output device, said input device including operator accessible controls controllingly associated with said output and mass storage devices;

said wearable assembly being adapted to including an electrical power source in electrical power supplying relationship to at least said display system;

a carrying harness adapted to supporting at least said display screen on a torso and below a neck of a person wearing said article of clothing;

a pad adapted to being adjustably positioned between said torso and said display screen in motion stabilizing relationship with said display screen;

a substantially transparent pane that is substantially impact and scratch resistant, said transparent pane being attached to said article of clothing and to said display screen in substantial registry with said display screen, said display screen being visible through said substantially transparent pane to a viewer located outside of said article of clothing, said display screen and substantially transparent pane being supported by said carrying harness for adjustment between higher and lower positions on said person's back and generally weight bearingly independent of said article of clothing; and except for said display screen and substantially transparent pane, said display system being substantially hidden from said viewer by said article of clothing.

2. A wearable assembly of claim 1 wherein said wearable assembly includes a geographic position locator beacon member.

3. A wearable assembly of claim 1 wherein said carrying harness comprises a sleeve that is adapted to wrap around said person's torso.

4. A method of displaying images from a wearable assembly wherein a display system is incorporated into an article of clothing, said method comprising:

selecting a said display system including at least an output device, a mass storage device, and an input device, said output device including at least a display device having a substantially rigid display screen, said mass storage device being in content providing relationship to said output device, said input device including operator accessible controls controllingly associated with said output and mass storage devices;

mounting said display screen on a torso and below a neck of a person wearing said article of clothing;

positioning a substantially transparent pane that is substantially impact and scratch resistant in substantial registry with said display screen, attaching said substantially transparent pane to said article of clothing and to said display screen, said display screen being visible through said substantially transparent pane to a viewer located outside of said article of clothing, said display screen and substantially transparent pane being mounted for adjustment between higher and lower positions on said person's back and to be generally weight bearingly independent of said article of clothing;

positioning a pad between said torso and at least a portion of said display screen in motion stabilizing relationship with said display screen;

except for said display screen and substantially transparent pane, substantially concealing at least said display system from said viewer by said article of clothing;

supplying electrical power to at least said display system; and allowing said images to appear on said display screen visible to said viewer.

\* \* \* \* \*